Patented June 20, 1950

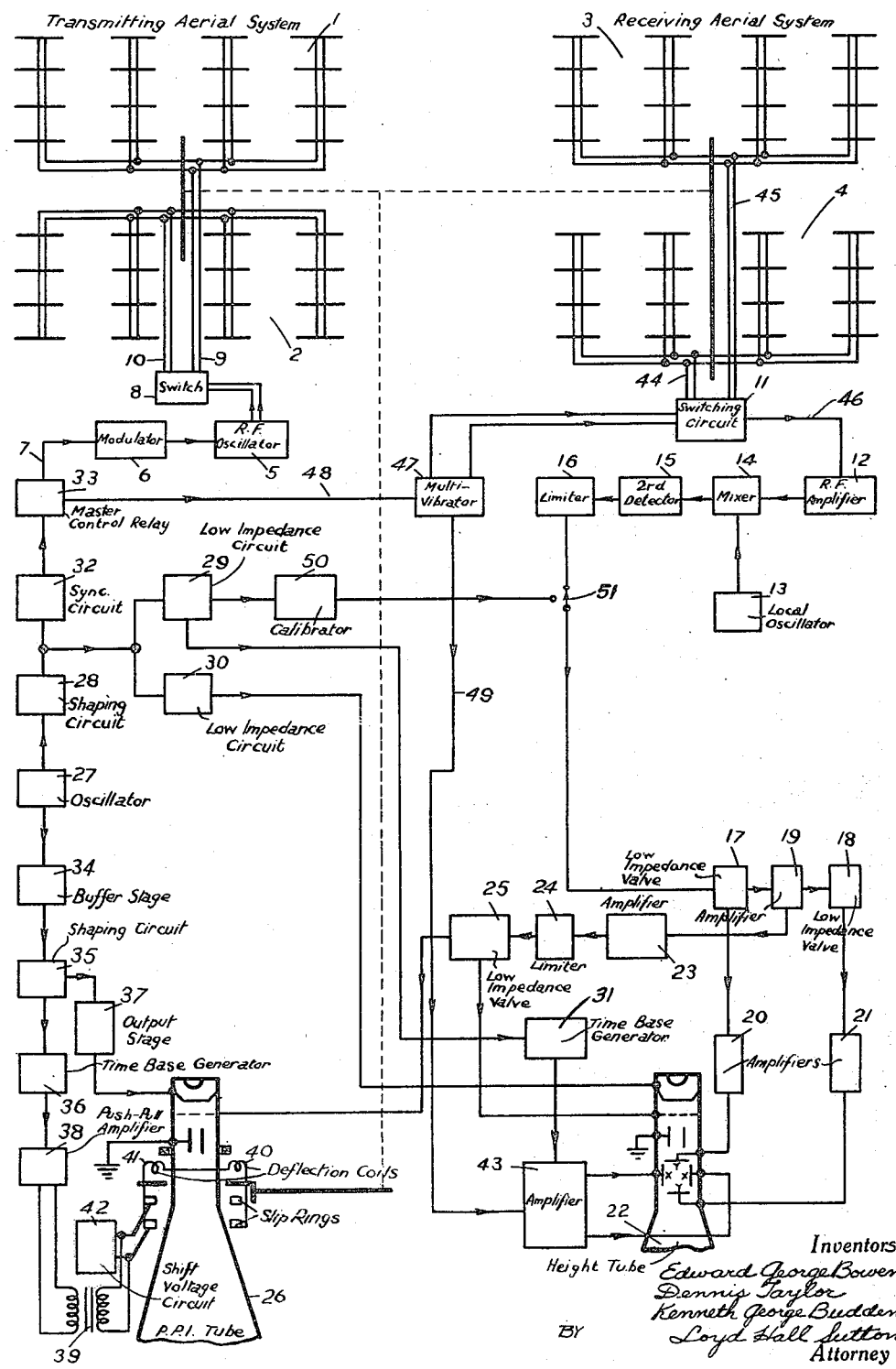

2,512,086

UNITED STATES PATENT OFFICE 2,512,086

RADIO LOCATING APPARATUS

Edward George Bowen, Cambridge, Mass., and Dennis Taylor, Malvern, and Kenneth George Budden, Salisbury, England, assignors to Minister of Supply in His Majesty's Government of Great Britain and Northern Ireland, London, England Application December 21, 1943, Serial No. 515,118½
In Great Britain December 25, 1942

6 Claims. (Cl. 343—11)

The present invention relates to radio installations for indicating the presence and location of one or more distant bodies, such as aircraft.

It is well known that a body within the field of a radio transmitter will reflect waves back along the path of incidence and that the time interval between the outgoing wave and the return of the corresponding reflected wave or echo is a measure of the distance of the body from the transmitter. If the reflected wave is picked up by a suitable directional aerial system the angle of bearing or the angle of elevation of the distant body can also be ascertained.

It is an object of the present invention to provide a radio installation which will enable an observer to follow the movements of any aircraft present within a certain region and to ascertain their location both relatively to each other and to the terrain over which they are flying, so that he can, for example, transmit to one or more of them such navigating or other information as may be desirable. As a case in point, the pilot of a fighter aircraft could be informed from the ground of the position in relation to him of a hostile aircraft in order to assist him in intercepting the latter.

Another object of the invention is to provide a radio installation which is adapted to indicate on a map or plan of a given region the positions as projected on this plan of any aircraft flying over the region.

According to the invention there is provided a radio installation for indicating the location of one or more distant bodies by means of radio frequency energy reflected from the body comprising a transmitter adapted to repeatedly traverse a pulse-modulated exploring beam over a region to be explored, a receiver for picking up the echo signals produced by reflection of the exploring beam by the bodies and means for presenting the echo signals on the screen of a first cathode ray oscillograph adapted to indicate the slant range and angle of bearing of the bodies, and also on the screen of a second cathode ray oscillograph which is co-ordinated with the first to indicate the angle of elevation of the same bodies. From the data so obtained the actual position in space of any selected aircraft can readily be ascertained.

According to the invention in another aspect, there is provided a radio installation comprising a transmitter having an aerial system adapted to radiate a pulse-modulated exploring beam of radio frequency energy, means for continuously rotating the aerial about a vertical axis so that the beam periodically scans the region to be explored, a receiving aerial system arranged to be rotated about a vertical axis in synchronism with the transmitting aerial system, means for utilizing signal voltages derived from the received echo signals to influence the electron beam of a cathode ray oscillograph, the said electron beam having imparted thereto firstly a linear scanning motion of a periodicity equal to that of the modulating pulses to provide a time-base or datum line extending from the centre to the periphery of the tube screen, and secondly a rotary scanning motion synchronous with the rotation of said aerial systems to cause the time base to rotate about the said centre.

Preferably the signal voltages are utilized to increase the intensity of the electron beam, so that any aircraft in the region scanned by the exploring beam will give rise to and will be represented by a bright spot on the tube screen. The distance of this spot along the radius measured from the centre of the screen will be a measure of the slant range of the aircraft whilst its angular position will be a measure of the angle of bearing of the aircraft. For low angles of elevation up to, say, 40° from the horizontal the position of the spot on the tube screen coincides substantially with the position of the aircraft as projected in plan, and a transparent map or chart of the region scanned by the exploring beam can accordingly be fitted to the tube screen.

According to a feature of the invention the angle of elevation of a selected aircraft is determined with the aid of the second cathode ray oscillograph by utilizing a receiving aerial system which includes an upper and a lower array, the oscillograph being fed in rapid succession with echo signals from the upper and lower arrays and the corresponding echo traces being presented side by side on the tube screen against a horizontal time base, whereby their amplitudes can be compared.

In order that the nature of the invention shall be more clearly understood and readily carried into effect, a preferred embodiment will now be described by way of example with reference to the accompanying drawing, which is a block diagram of a complete installation.

The aerial systems, shown diagrammatically in the drawing each consist of two broadside arrays backed by reflectors, 1 and 2 indicating the transmitting arrays, and 3 and 4 the receiving arrays. Each pair of arrays are mounted on a vertical shaft, one array being above and the other below the gear which rotates the shaft, the two shafts being rotated in synchronism. Each array comprises four stacks of four horizontal full-wave dipoles.

The transmitter comprises a carrier-wave oscillator 5 consisting of a pair of push-pull valves which are preferably of the thoriated filament or other type capable of developing a high peak output, and are arranged as a self-blocking unit. The common anode, cathode and grid circuits are Lecher-tuned and the aerial load is Lecher-coupled to the grid circuit. Normally the valves are held quiescent by a high negative potential applied to the grids, but when this is periodically neutralized by a positive pulse from the modulator circuit 6, the valves oscillate at the carrier frequency for a short period of approximately 5 microseconds which is determined by the time-constant of the grid circuit. The period is ended by the blocking action of the valves and the negative grid bias is restored until the arrival of the next pulse from the modulator 6. The carrier frequency is in the neighbourhood of 200 megacycles per second and the repetition frequency of the pulses can be selected within a range of 350–1000 per second.

The modulator 6 comprises a thermionic valve which is arranged so that it can be strongly back-coupled to act as a self-blocking oscillator to generate impulses at the pulsing frequency, or, instead, can be fed with impulses at this frequency through a locking line 7 from a master control relay to be described later. The output from the valve 6 is shaped and amplified and passed to an output circuit comprising two pairs of parallel-connected valves having a common cathode load in the earthed negative lead of the high tension supply. The normal cathode potential of these valves is highly negative and determines the grid bias on the carrier frequency oscillator 5. Under the influence of the amplified and shaped impulse from the first valve, the grids of these output valves are thrown positive and, due to the common cathode load, the cathodes follow suit and thus trigger the oscillator 5.

The output from this oscillator is fed to the aerial arrays 1, 2 through a switch 8 comprising a network of quarter-wave line sections, some of which have open ends which can be short-circuited at will through electromagnetic relays, the whole arrangement being such that three alternative paths for the energy from the oscillator are possible, one being through the feeder 9 to the upper array 1, the second being through the feeder 10 to the lower array 2, and the third being through both feeders 9 and 10 in parallel to both arrays. Thus either or both of the arrays can be switched into operation at will so as to displace the main lobe of the polar diagram in the vertical plane and give a substantially gap-free coverage in elevation of the region to be surveyed. As previously mentioned, the arrays are continually rotated in azimuth so that the exploring beam scans the region to be surveyed.

Echo signals picked up by the receiving arrays 3, 4 are fed through a switching circuit 11, to be described later, to the signal receiver which comprises a signal frequency amplifier 12, local oscillator 13, mixer 14, intermediate frequency amplifier and second detector 15, and an amplitude limiting circuit 16. The output stage consists of two low impedance valves 17, 18 connected through an amplifier 19 which serves to reverse the phase of the signals fed to the valve 18, so that the outputs from 17 and 18 are in push-pull. These outputs are amplified at 20, 21 and are fed to the Y-plates of the cathode ray tube 22. A portion of the signal output is fed from the amplifier 19 through an amplifier 23, a circuit 24 comprising two limiting diodes one of which serves to bring the signals to a common datum line and the other serves to limit the signal amplitude, and low impedance output valve 25 to the grid of the cathode ray tube 26, and also the grid of the cathode ray tube 22.

The pulsing frequency of the transmitter and the frequency of the time-base generators for the cathode ray tubes are synchronized and controlled by a master relay. This comprises a resistance controlled oscillator 27 which is back coupled through a phase shifting network including a variable resistance to enable the frequency to be chosen at will within a desired range. A part of the resulting sinusoidal output is passed through a shaping circuit 28, the resulting square-topped impulses being applied through low impedance output circuits 29, 30 to control a time-base generator 31 for the tube 22 and to apply a periodic black-out voltage to the cathode of the tube 22. These impulses are also passed to a circuit 32 which comprises a valve with an input circuit having a variable time constant and is used to generate synchronizing pulses of controllable width, and these pulses are passed through the low-impedance output circuit 33 to control the modulator 6. Another portion of the sinusoidal output from the circuit 27 is fed through a low-impedance buffer stage 34 to the shaping circuit 35, the square-topped output of which is used to control the time base generator 36 for the tube 26 and is also passed through the low-impedance output stage 37 to the cathode of the tube 26 to provide a black-out voltage for this tube.

The time-base generator 36 comprises a resistance in series with a condenser, both being shunted by a diode valve. The condenser first charges up through the resistance to a voltage having a peak amplitude determined by the square-topped impulses from the circuit 35. It then discharges at an equal rate, the resulting voltage developed over each cycle having a wave form which is approximately triangular with equally inclined flanks. This voltage is applied to an amplifier which has a variable resistance in series with a condenser in its output circuit in order to correct for a slight exponential curvature in the wave form of the voltage, and the resulting linearised voltage is applied through a push-pull amplifier 38 and transformer 39 to the deflecting coils 40, 41 of the tube 26. These coils are rotated about the neck of the tube 26 at a speed equal to the speed of rotation of the aerial systems and these rotations are synchronized so that the radial direction of the time-base on the screen of the tube 26 at all times represents the orientation of the aerials. An independent shift voltage developed by the circuit 42 is applied to the deflecting coils 40, 41 to ensure that the time-base starts from the centre and finishes at the periphery of the tube screen.

Assuming that a number of aircraft are present in the region covered by the exploring beam radiated from arrays 1, 2, then these aircraft will be represented on the screen of the tube 26 by an equal number of echo-traces in the form of spots of light distributed over the screen in accordance with the slant range and bearing in azimuth of the aircraft, the former being determined by the distance of the echo-trace from the centre of the screen along the radius and the latter by the direction of this radius. The screen carries a transparent map of the region, and the positions of the echo-traces on this map give with fair accuracy the positions of the aircraft as projected in plan provided that the angles of elevation of the aircraft are low and do not exceed 40°.

The time-base generator 31 is essentially the same as the generator 36, the the linearized output is fed through the amplifier 43 consisting of two stages to give paraphrase amplication to the X-plates of the tube 22. The shaping circuit 35 includes a phase-shifting network which enables the time base voltages for both tubes 22 and 26 to be accurately aligned. The echo-traces produced on the screen of the tube 22 by the incidence of echo signal voltages on the Y-plates and grid of the tube, are therefore distributed according to their ranges along a horizontal time base, and every echo trace on the screen of the tube 26 will have its counterpart on the screen of the tube 22. The tube 22 is employed to determine the angle of elevation of the various targets indicated on the tube 26 and for this purpose each echo-trace on the screen of the tube 22 is in fact a pair of traces, one of which indicates the amplitude of the echo-signal received on the upper array 3 whilst the other which is shifted slightly along the X-axis so as to be separated from the first, indicates the amplitude of the echo-signal received on the lower array 4. The amplitude ratio of the two traces will be a measure of the angle of elevation of the target giving rise to them.

The production of the pair of traces is achieved by switching the signal outputs from the arrays 3 and 4 by means of the aerial switch 11 in rapid succession to the signal amplifier 12, and applying in synchronism with the application of one of these outputs a small shift voltage to the X-plates of the tube 22, so that the trace due to this output is shifted along the X-axis with respect to the trace due to the other output. The switch 11 comprises a pair of diodes, the discharge path of each diode bridging the open end of a shunt line in the form of two co-axial quarter-wave line sections. The feeders 44, 45 are connected through two quarter-wave forks to the line 46 and each shunt line is shunted across the junction point of one of the feeders 44, 45 and its quarter wave fork. So long as the diode is non-conducting it open-circuits the shunt line so that the impedance of the latter is too high to affect the signal energy flowing in the corresponding feeder. When the diode conducts its electron stream effectively reduces the shunt impedance to a value which represents a short circuit across the end of the corresponding quarter-wave fork, and at the same time its impedance remains high as seen from the junction of the quarter-wave fork and the line 46 since this point is three-quarters of a wavelength away.

The alternate switching of the diodes is performed by impulses occurring at half the pulsing frequency which are generated by a multivibrator 47 locked to the master control relay through the lead 48. A portion of the output of the multivibrator is applied through the lead 49 and amplifier 43 to the X-plates of the tube 22 to provide the shift voltage. The aerial switch 11 is controlled through a manual three-position switch (not shown in the drawing). In one position of the switch, both diodes are rendered permanently non-conducting and signals from both the upper and lower arrays are fed together in phase to the receiver. In the second or height-finding position, the diodes are controlled by the multivibrator 47 as described above and the shift voltage is applied to the X-plates of the tube 22. The correct interpretation of the comparative signal amplitudes in terms of the angle of elevation of the body under observation depends upon both signals being in phase, and the third position of the switch allows this to be checked by rendering one diode permanently non-conducting whilst the other is rendered alternately conducting and non-conducting by the impulses from the multivibrator 47. Thus combined signals from both arrays are fed to the receiver in alternation with signals from one array alone, and if the amplitude of the latter is smaller than that of the combined signal, both signals are in phase, whilst if it is larger, they are not.

Instead of, or in addition to using the main upper and lower arrays for determining the angle of elevation, one or both of the arrays may be sub-divided horizontally and the same procedure applied to the upper and lower sub-sections so formed.

It is desirable to check the time bases from time to time against a fixed calibrating frequency and for this purpose a circuit 50 is provided. This comprises a valve having an anode circuit tuned to a frequency of 18.6 kilocycles. The application of a negative bias to the grid of this valve by the master control relay shock excites this tuned circuit and the resulting train of sine waves is treated so as to select half waves of the same sign which are then converted into sharp pulses, i. e., peaked, each pulse having a duration of about 5 microseconds the frequency of recurrence being 18.6 kilocycles. As the triggering voltage from the master control relay reverses in sign, the valve begins to conduct and thus swamps the sine wave output until the incidence of the next negative pulse. The calibrating impulses are rectified and limited in amplitude and are fed to the Y-plates and grid of the tube 22 and to the grid of the tube 26 in place of the echo signals through the switch 51. A calibration pattern consisting of traces separated by standard amount equivalent to a slant range of half a mile thus appears on the screens of the tubes, provided that the time bases are accurate.

It should be noted that the echo signal reflected from an object will consist of a train of pulses recurring, not at the frequency of the transmitted pulses, but at the much lower frequency of rotation of the aerials, and consequently it is necessary to provide both cathode ray tubes with long afterglow screens in order to avoid pronounced flicker of the echo traces.

We claim:
1. Radio-locating apparatus for indicating the location of distant bodies comprising a first directional aerial system, a pulse transmitter connected to said aerial system, a second directional aerial system for picking up echo signals produced by reflection of the transmitted pulses from said distant bodies, said second aerial system consisting of an upper and lower aerial array, a receiver connected to said second aerial system, means for rotating said aerial systems in synchronism to cause the transmitted pulses to traverse a region to be explored, a first cathode ray tube, time base generating means synchronized with said transmitter for providing a radial time base trace for said cathode ray tube, means for rotating said time base trace about the centre of the tube in synchronism with the rotation of said aerial systems, means for applying the output of said receiver to said first cathode ray tube to provide an indication of the slant range and bearing in azimuth of the distant bodes by modifying the rotating radial time base trace, a second cathode ray tube, time base generating means synchronised with said transmitter for providing a linear time base trace for said second cathode ray tube and means for separately displaying echo signals received from a distant body by each of said aerial arrays on the screen of said second cathode ray tube as deflections of said linear time base trace to enable the bearing in elevation of said distant body to be determined from the amplitude ratio of said deflections.

2. Radio-locating apparatus for indicating the location of distant bodies comprising a first directional aerial system, a pulse transmitter connected to said aerial system, a second directional aerial system for picking up echo signals produced by reflection of the transmitted pulses by said distant bodies, said second aerial system consisting of an upper and lower aerial array, a receiver connected to said second aerial system, means for rotating said aerial systems in synchronism to cause said transmitted pulses to traverse a region to be explored, a first cathode ray tube having a luminescent screen, means for applying echo signals to said cathode ray tube to provide an indication of the slant range and bearing in azimuth of said distant bodies, a second cathode ray tube having a luminescent screen, time base generating means synchronised with said transmitter for providing a linear time base trace for said second cathode ray tube and means for separately displaying echo signal received from a distant body by each of said aerial arrays on the screen of said second cathode ray tube as deflections of said linear time base trace to enable the bearing in elevation of said distant body to be determined from the amplitude ratio of said deflections.

3. Radio-locating apparatus for indicating the location of distant bodies comprising a directional aerial arrangement, a pulse transmitter, a receiver responsive to echo signals produced by reflection from distant bodies of the transmitted pulses, means for rotating said aerial arrangement, first and second cathode ray tubes each having a luminescent screen, time base generating means synchronised with said transmitter for providing a radial time base trace for said first cathode ray tube, means for rotating said time base about the centre of the screen of said first cathode ray tube in synchronism with the rotation of said aerial arrangement, means for applying the received echo signals to said first cathode ray tube to provide an indication in plain position of the slant range and bearing in azimuth of said distant bodies, time base generating means synchronised with said transmitter for providing a linear time base trace for said second cathode ray tube and means for applying the received echo signals to said second cathode ray tube to provide an indication of the bearing in elevation of said distant bodies by deflections of said linear time base trace.

4. Radio-locating apparatus for indicating the location of distant bodies comprising a first directional aerial system, a pulse transmitter connected to said aerial system, a second directional aerial system for picking up echo signals produced by reflection from distant bodies of the transmitted pulses, said second aerial system consisting of an upper and a lower aerial array, a receiver, automatically operated switching means operating at half the pulse recurrence frequency of said transmitter for alternately connecting said receiver to said upper and lower aerial array, a first cathode ray tube, means for applying echo signals to said cathode ray tube to provide an indication in plan position of the slant range and bearing in azimuth of said distant bodies, a second cathode ray tube, time base generating means synchronised with said transmitter for providing a linear time base trace for said second cathode ray tube and means for displaying echo signals received by each of said aerial arrays as juxtaposed deflections of said linear time base trace to enable the bearing in elevation of said distant bodies to be determined from the amplitude ratio of said deflections.

5. Radio-locating apparatus for indicating the location of distant bodies comprising a first directional aerial system consisting of a plurality of aerial arrays arranged one above the other, a pulse transmitter, means for connecting said pulse transmitter at will to differing combinations of said aerial arrays, a second directional aerial system for picking up echo signals produced by reflection from distant bodies by said transmitted pulses, said second aerial system consisting of an upper and a lower aerial array, a receiver, automatically operated switching means operating at half the pulse recurrence frequency of said transmitter for alternately connecting said receiver to said upper and lower aerial arrays, means for rotating said aerial systems in synchronism, a first cathode ray tube having a luminescent screen, time base generating means synchronised with said transmitter for providing a radial time base trace for said cathode ray tube, means for rotating said time base trace about the centre of said screen in synchronism with the rotation of said aerial systems, means for applying the output of said receiver to said cathode ray tube to provide an indication in plain position of the slant range and bearing in azimuth of said distant bodies, a second cathode ray tube, time base generating means synchronised with said transmitter for providing a linear time base trace for said second cathode ray tube and means for displaying echo signals received by each of said upper and lower aerial arrays as juxtaposed deflections of said time base trace to enable the bearing in elevation of said distant bodies to be determined.

6. Radio-locating apparatus for indicating the location of distant bodies comprising a first directional aerial system, a pulse transmitter connected to said aerial system, a second directional aerial system for picking up echo signals produced by reflection of the transmitted pulses by said distant bodies, said second aerial system consisting of an upper and lower aerial array, a receiver, a multivibrator circuit sychronised with the transmitter, switching means controlled by said multivibrator circuit for alternately connecting said receiver to said upper and lower aerial array, a first cathode ray tube, means for applying echo signals to said cathode ray tube to provide an indication of the slant range and bearing in azimuth of said distant bodies, a second cathode ray tube, time base generating means synchronised with said transmitter for providing a linear time base trace for said second cathode ray tube, means for applying the output of said receiver to said cathode ray tube and means controlled by said multivibrator circuit for applying a shift voltage to said cathode ray tube to enable the bearing in elevation of the distant bodies to be determined from the juxtaposed deflections of said linear time base trace due to the output from said receiver.

EDWARD GEORGE BOWEN.
DENNIS TAYLOR.
KENNETH GEORGE BUDDEN.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,241,809 | DeRorest | May 13, 1941 |
| 2,242,910 | Hahnermann | May 20, 1941 |
| 2,297,228 | Kramar | Sept. 29, 1942 |
| 2,312,203 | Wallace | Feb. 23, 1943 |
| 2,307,184 | Alford | June 5, 1943 |
| 2,412,159 | Leeds | Dec. 3, 1946 |
| 2,416,088 | Deerhake | Feb. 18, 1947 |
| 2,422,361 | Miller | June 17, 1947 |
| 2,423,644 | Evans | July 8, 1947 |
| 2,424,984 | Hoffman | Aug. 5, 1947 |
| 2,445,213 | Evans | July 13, 1948 |

FOREIGN PATENTS

| Number | Country | Date |
|---|---|---|
| 497,147 | Great Britain | Dec. 9, 1938 |
| 520,778 | Great Britain | May 3, 1940 |
| 542,634 | Great Britain | Jan. 21, 1942 |
| 552,072 | Great Britain | Mar. 22, 1943 |